United States Patent
Kim et al.

(10) Patent No.: US 9,299,995 B2
(45) Date of Patent: Mar. 29, 2016

(54) MANIFOLD BLOCK FOR FUEL CELL STACK

(75) Inventors: Duck Whan Kim, Seoul (KR); Young Bum Kum, Seoul (KR); Sae Hoon Kim, Gyeonggi-do (KR); Jung Han Yu, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 801 days.

(21) Appl. No.: 13/314,987

(22) Filed: Dec. 8, 2011

(65) Prior Publication Data

US 2013/0017468 A1 Jan. 17, 2013

(30) Foreign Application Priority Data

Jul. 12, 2011 (KR) .................. 10-2011-0069144

(51) Int. Cl.
- *H01M 8/04* (2006.01)
- *H01M 8/24* (2006.01)
- *H01M 8/02* (2006.01)
- *H01M 8/00* (2006.01)
- *H01M 8/10* (2006.01)

(52) U.S. Cl.
CPC ........ *H01M 8/04029* (2013.01); *H01M 8/2465* (2013.01); *H01M 8/2485* (2013.01); *H01M 8/00* (2013.01); *H01M 8/02* (2013.01); *H01M 2008/1095* (2013.01); *Y02E 60/50* (2013.01)

(58) Field of Classification Search
USPC ......................................... 429/452
See application file for complete search history.

(56) References Cited

U.S. PATENT DOCUMENTS

| | | | | |
|---|---|---|---|---|
| 4,483,910 A | * | 11/1984 | Julian | 429/179 |
| 8,168,344 B2 | * | 5/2012 | Hawkins et al. | 429/439 |
| 2006/0024559 A1 | | 2/2006 | Benthem et al. | |
| 2010/0190068 A1 | | 7/2010 | Miyajima et al. | |

FOREIGN PATENT DOCUMENTS

| | | |
|---|---|---|
| CN | 101098015 A | 1/2008 |
| JP | 09-045357 | 2/1997 |
| JP | 2005-108524 A | 4/2005 |
| JP | 2006-004759 | 1/2006 |
| JP | 2006-049129 | 2/2006 |
| JP | 2006-049129 A | 2/2006 |
| JP | 2006-059652 A | 3/2006 |
| JP | 2010-010073 | 1/2010 |
| JP | 2010-055892 A | 3/2010 |
| JP | 2010-165614 | 7/2010 |
| JP | 2010-272231 A | 12/2010 |
| JP | 2013-120626 A | 6/2013 |
| WO | 2006-022994 A2 | 3/2006 |

\* cited by examiner

*Primary Examiner* — Patrick Ryan
*Assistant Examiner* — Carmen Lyles-Irving
(74) *Attorney, Agent, or Firm* — Mintz Levin Cohn Ferris Glovsky and Popeo, P.C.; Peter F. Corless (57) ABSTRACT

The present invention provides a manifold block for a fuel cell stack, coupled to a fuel cell stack module and having a gas passage and a cooling water passage. The manifold block includes an insulating member and an insulating cover. The insulating member is inserted into the cooling water passage and contacts an inner surface of the cooling water passage. The insulating member has a tube-like shape and electrically insulates the inner surface of the cooling water passage. The insulating cover is inserted into the cooling water passage and contacts an inner surface of the insulating member. The insulating cover fixes and protects the insulating member.

11 Claims, 6 Drawing Sheets

FIG. 1

RELATED ART

MANIFOLD BLOCK FOR FUEL CELL STACK

CROSS-REFERENCE TO RELATED APPLICATION

This application claims under 35 U.S.C. §119(a) the benefit of Korean Patent Application No. 10-2011-0069144 filed Jul. 12, 2011, the entire contents of which are incorporated herein by reference.

BACKGROUND (a) Technical Field

The present invention relates to a manifold block for a fuel cell stack. More particularly, it relates to a manifold block for a fuel cell stack, which can guarantee excellent electric insulation of a cooling water passage disposed within internal passages of the manifold block, the cooling water passage having a straight-line shape that is bent at a certain angle.

(b) Background Art

A fuel cell is a type of power generation device that converts chemical energy of fuel into electrical energy by an electrochemical reaction in a stack, instead of transforming the chemical energy into heat by combustion. Among the various types of fuel cells, Polymer Electrolyte Membrane Fuel Cells (PEMFCs, also known as Proton Exchange Membrane Fuel Cells) having a high power density are being extensively studied as a power supply source for driving vehicles.

Polymer electrolyte membrane fuel cells include a Membrane-Electrode Assembly (MEA) formed of (a) a solid polymer electrolyte membrane through which hydrogen ions move, (b) catalyst electrode layers, in which an electrochemical reaction occurs, attached to both surfaces of the solid polymer electrolyte membrane, (c) a gas diffusion layer, that evenly distributes reactant gases and serves to transmit generated electrical energy, provided on the outer sides of each catalyst electrode layer, and (e) a gasket and coupling members for maintaining appropriate pressure and for maintaining air-tightness to prevent leakage of reactant gases and cooling water. A bipolar plate that allows reactant gases and cooling water to move along a reaction passage is further stacked on the outer sides of the gas diffusion layers to form a unit fuel cell. A fuel cell stack having a desired power output is then manufactured by stacking a plurality of such unit cells.

Further, a manifold block is assembled into the fuel cell stack. The manifold block is a kind of passage member that allows gases and cooling water to flow into and out of a fuel cell before and after a reaction, and forms an inlet passage and an outlet passage of a fuel cell stack.

The manifold block has a long and complicated internal passage that allows gases and cooling water to pass through. When a plurality of stack modules are mounted in a fuel cell vehicle, a manifold block attached to the outer side of the stack module serves to evenly supply reactant gases (air and hydrogen) and cooling water to each stack module.

In order to manufacture such a manifold block, a method is provided wherein a block shape is formed using an aluminum casting process, followed by coating cooling water passages with insulation.

Figure 1:
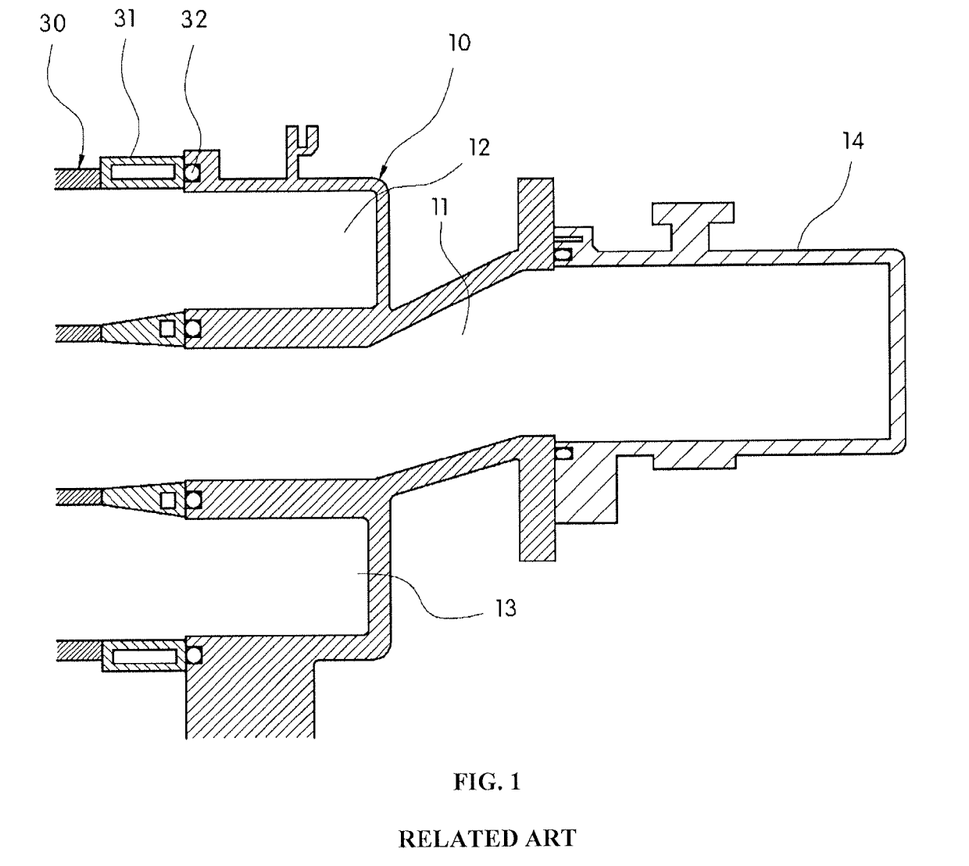
FIG. 1 is a cross-sectional view taken along a cooling water passage illustrating a typical manifold block coupled to a stack module.

FIG. 1 is a cross-sectional view illustrating a typical manifold block having a cooling water passage 11 and coupled to a stack module, which is taken along the cooling water passage 11.

As shown in FIG. 1, an end plate 31 is coupled to the outmost side of a stack module 30 in which unit cells, such as membrane-electrode assembly, gas diffusion layer, bipolar plate and gasket are stacked, and a manifold block 10 is attached to the outer side of the end plate 31 with a gasket 32 is disposed therebetween.

An interface part 14 for receiving cooling water is coupled to one side of the manifold block 10. Cooling water supplied to the interface part 14 passes through the cooling water passage 11 in the manifold block, and is then supplied to the stack module 30. Cooling water from the stack module 30 is subsequently exhausted to the outside via a further interface part (not shown). In particular, cooling water from the stack module 30 passes through a further cooling passage (not shown), and the further interface part for exhausting the cooling water from the stack module 30.

The interface part 14 and further interface part may be formed of a suitable insulating material, such as plastic and the like.

As shown, the cooling water passage 11 is bent at a certain angle and has a straight-line shape in the manifold block 10. During operation of the fuel cell stack, the cooling water passage 11 is always full of cooling water.

Thus, while cooling water is contained in the cooling water passage 11 of the manifold block 10, high-voltage electricity generated in the stack module 30 may leak out through cooling water. Such leakage of electricity may cause electric shock to a user or a worker.

Accordingly, in order to prevent leakage of electricity, an insulation coating (e.g., ceramic coating, epoxy coating, and Teflon coating) is provided on the entire cooling water passage 11 of the manifold block 10.

However, while the manifold block 10 shown in FIG. 1 is advantageous because a differential pressure can be reduced due to the simple structure and a sufficient size of a cooling water passage, it also presents limitations in coating. In particular, the manifold block 10 has limitations in that significant deviation of coating quality occurs according to working conditions during the insulation coating process, and the surface roughness increases due to lumping of the coating.

Also, although insulation performance may be satisfactory initially, as time goes by, deterioration of the coating progresses and the insulation coating is gradually reduced. Furthermore, electrical corrosion occurs as the insulation coating deteriorates.

The above information disclosed in this Background section is only for enhancement of understanding of the background of the invention and therefore it may contain information that does not form the prior art that is already known in this country to a person of ordinary skill in the art.

SUMMARY OF THE DISCLOSURE

The present invention provides a manifold block for a fuel cell stack, which can guarantee excellent electrical insulation of a cooling water passage without requiring an insulation coating.

In one aspect, the present invention provides a manifold block for a fuel cell stack. The manifold block is coupled to a fuel cell stack module and has a gas passage and a cooling water passage, and includes: an insulating member disposed within the cooling water passage and contacting an inner surface of the cooling water passage, the insulating member having a tube-like shape and providing electrical insulation of the cooling water passage; and an insulating cover disposed within the cooling water passage and contacting an inner surface of the insulating member, the insulating cover configured to fix and protect the insulating member.

In an exemplary embodiment, the insulating cover may have a multiple-part structure (i.e., the insulating cover may be formed of multiple, such as two, parts which combine or connect together to form the insulating cover) at a passage insertion part thereof that is inserted into the cooling water passage, and divided insulating covers may be inserted into the insulating member at both (opposing) sides of the cooling water passage, respectively.

In another exemplary embodiment, when the divided insulating covers are completely inserted into the cooling water passage, the passage insertion parts of both divided insulating cover may be connected to each other.

In still another exemplary embodiment, the manifold block may further include: a flange formed at both end portions (e.g., flanges 21b, 22) of the insulating member to surround the whole of an outer edge of the cooling water passage; and a flange formed at an end portion of the insulating cover to contact the flange of the insulating member. Here, the flange of the insulating cover and the flange of the insulating member may be disposed tightly in between the manifold block and the stack module while being coupled to each other.

In yet another exemplary embodiment, the flange of the insulating cover may have a groove for inserting a sealing gasket between the stack module and the manifold block.

In still yet another exemplary embodiment, the flange of the insulating cover may have a sealing protrusion that can be compressed on the flange of the insulating member to maintain air-tightness between the flanges.

In a further exemplary embodiment, the flange of the insulating member may have a sealing protrusion that can be compressed on the flange of the insulating cover to maintain air-tightness between the flanges.

In another further exemplary embodiment, the sealing protrusion may be formed to protrude longitudinally along a line of the sealing gasket disposed between the flange of the insulating cover and the stack module.

In still another further exemplary embodiment, the insulating cover may further include a passage insertion part that is inserted into a gas passage of the manifold block to cover an inner surface of the gas passage.

In yet another further exemplary embodiment, the insulating cover may include a bolt cover that may be integrally formed and that covers a coupling part where the manifold block is coupled with a bolt. Further, when the bolt is fastened in a state where the bolt cover overlaps the coupling part of the manifold block, the bolt cover may serve as an insulator between the bolt and the manifold block.

Other aspects and exemplary embodiments of the invention are discussed infra.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

Reference numerals set forth in the Drawings includes reference to the following elements as further discussed below:

| | |
|---|---|
| 10: manifold block | 11: cooling water passage |
| 12: air passage | 13: hydrogen passage |
| 14: interface part | 21: insulating member |
| 21a: ring | 21b: flange |
| 22: flange | |
| 23: insulating cover | 23a, 23b, 23c, 23d: passage insertion part |
| 24: flange | 25: groove |
| 26: sealing protrusion | 27: bolt cover |
| 30: stack module | 31: end plate |
| 32: gasket | |

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The above and other features of the invention are discussed infra.

The present invention relates to a manifold block for a fuel cell stack, which is configured to guarantee excellent electric insulation of an internal cooling water passage, the cooling water passage having a straight-line shape that is bent at a certain angle Particularly, in a manifold block according to an embodiment of the present invention, excellent insulation and insulation durability may be guaranteed without use of an insulation coating, and electrical corrosion may be effectively prevented. In particular, according to an embodiment of the present invention, an insulating member having a shape corresponding to the shape of a cooling water passage is inserted into the cooling water passage. The insulating member can be formed of any suitable insulating material that provides the cooling water passage with the desired insulation and insulation durability (e.g. a rubber material). The insulating member may then be fixed in place and protected with an insulating cover, which can in some embodiments comprise a two-part plastic insulating cover the two parts being inserted into the insulating member at both (opposing) sides of the cooling water passage.

Figure 2:
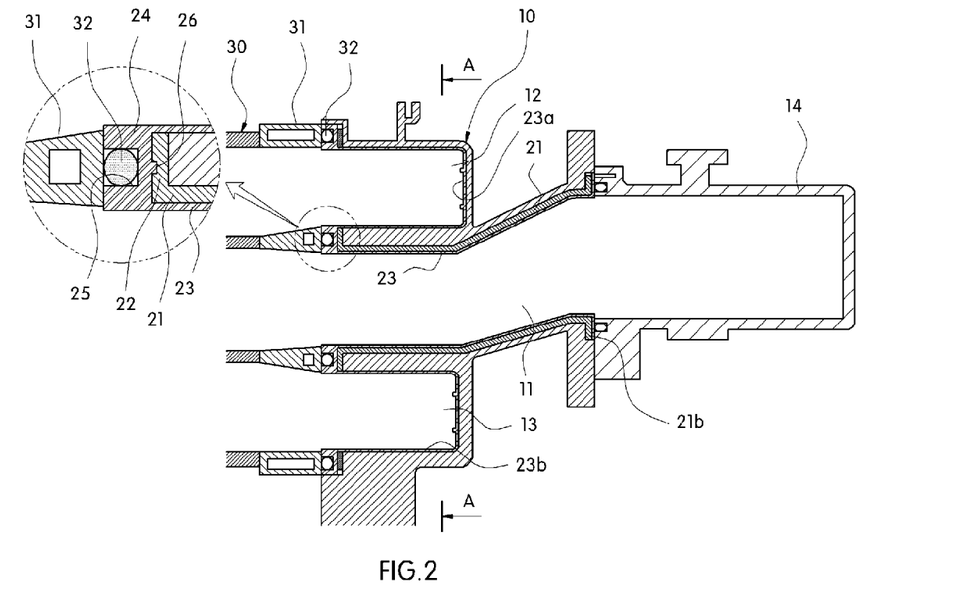
FIG. 2 is a cross-sectional view taken along a cooling water passage illustrating a manifold block coupled to a stack module according to an embodiment of the present invention.

FIG. 2 is a cross-sectional view illustrating a manifold block 10 coupled to a stack module 30 according to an embodiment of the present invention, which view is taken along a cooling water passage 11.

Figure 3:
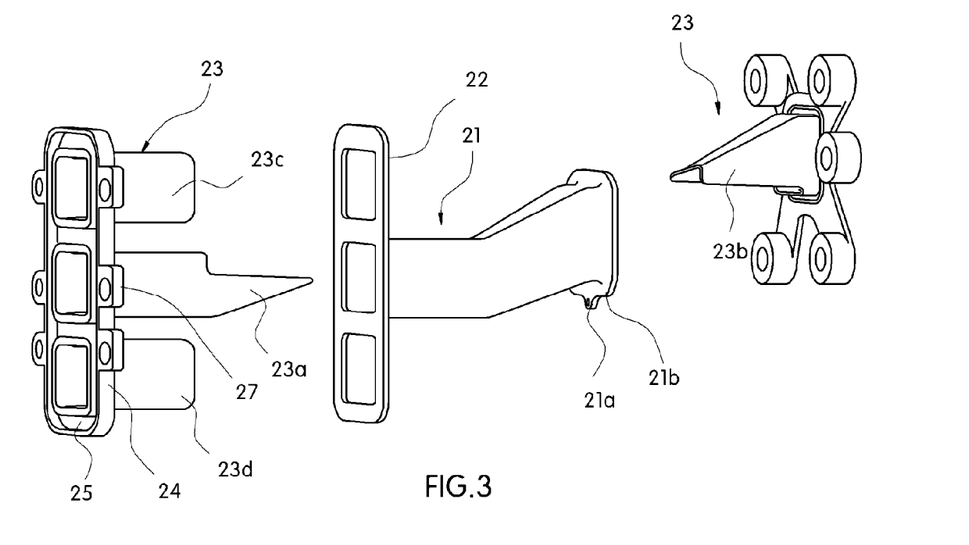
FIG. 3 is a perspective view illustrating an insulating member and an insulating cover in a manifold block according to an embodiment of the present invention.
Figure 4:
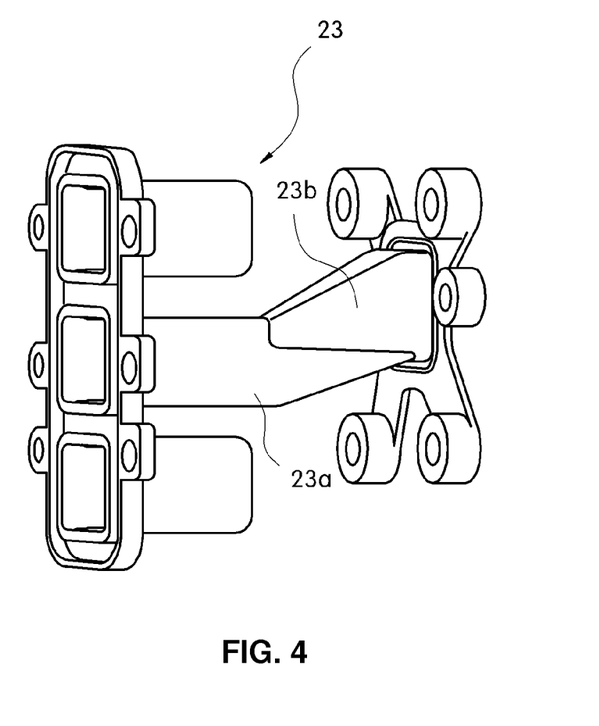
FIG. 4 is a perspective view illustrating two insulating covers that are assembled according to an embodiment of the present invention.
Figure 5:
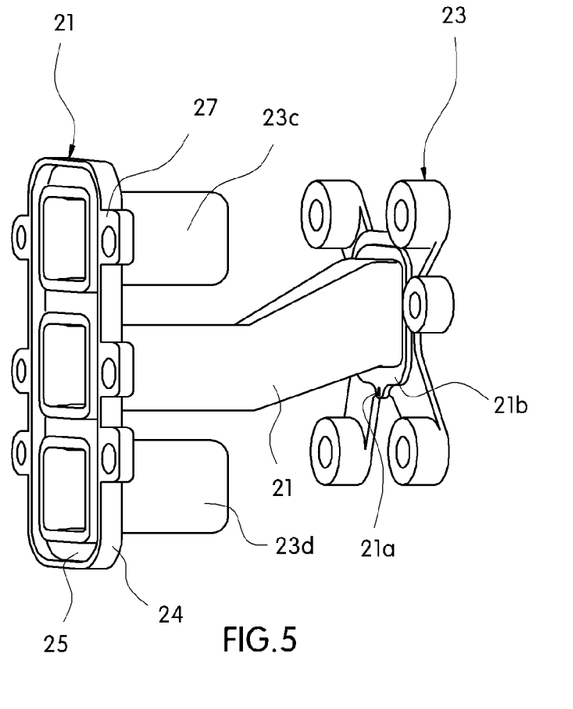
FIG. 5 is a perspective view illustrating an insulating member and two insulating covers that are assembled according to an embodiment of the present invention.

FIG. 3 is an exploded perspective view illustrating an insulating member 21 and an insulating cover 23 (which is depicted as a two-part structure) which can be inserted in a manifold block 10 according to an embodiment of the present invention. FIG. 4 is a perspective view illustrating two parts of an insulating cover 23 that are assembled according to an embodiment of the present invention. FIG. 5 is a perspective view illustrating an insulating member 21 and two parts of an insulating cover 23 that are assembled according to an embodiment of the present invention.

Figure 6:
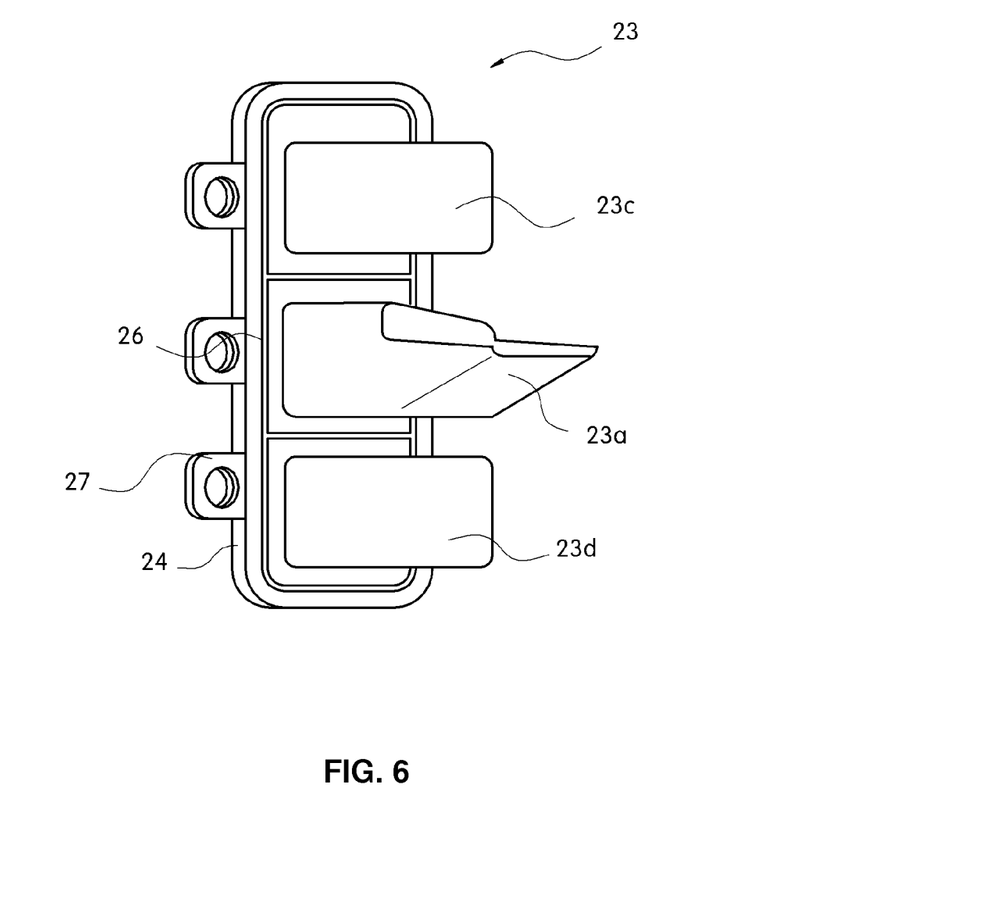
FIG. 6 is a perspective view of the rear surface of an insulating cover according to an embodiment of the present invention, which illustrates a sealing protrusion formed in a flange of the insulating cover.

Also, FIG. 6 is a perspective view of the rear surface of an insulating cover 23 according to an embodiment of the present invention, which illustrates a sealing protrusion 26 formed in a flange 24 of the insulating cover 23.

A manifold block according to an embodiment of the present invention may be manufactured by a casting process using metal, for example, an aluminum casting process, and may be attached to a fuel cell stack to supply reactant gases and cooling water to the fuel cell stack.

If a plurality of stack modules (e.g., vertically-disposed stack modules) are mounted in a fuel cell vehicle, the manifold block 10 may be attached to the outer side of the stack module 30 and may serve to evenly supply reactant gases (air and hydrogen) and cooling water to each stack module.

As shown in FIG. 2, an interface part 14 may be coupled to one side of the manifold block 10. The interface part 14 may be formed of any suitable insulation material, such as a polymer insulation material. The interface part is configured to receive cooling water and is in connection with the cooling water passage 11. Cooling water supplied to the interface part 14 may pass through the cooling water passage 11 in the manifold block 10, and is then supplied to the stack module 30. From the stack module 30, the cooling water may then be exhausted to the outside through a further interface part (not shown).

In an embodiment of the present invention, the cooling water passage 11 is within the internal passages of the manifold block 10, and is provided with a tube-like shape. In particular, as shown in FIG. 2, the cooling water passage 11 may have a substantially rectangular shaped section and a straight-line shaped section that is obliquely bent at a certain angle with respect to the substantially rectangular shaped section.

In such a structure, when the cooling water passage 11 is not insulated, high-voltage electricity generated in the stack module 30 may leak out of the vehicle chassis through the manifold block 10 via the cooling water, and may cause electrical harm to an operator or a worker.

Accordingly, the inner surface of the cooling water passage 11 which contacts the cooling water should be electrically insulated. Thus, in accordance with the present invention, an pre-formed insulating member 21 having a shape corresponding to the inner surface of the cooling water passage 11 (e.g., having a tube-like shape) for providing insulation may be inserted into the cooling water passage 11 of the manifold block 10. Further, an insulating cover 23 for fixing and protecting the insulating member 21 may be inserted into the insulating member 21 at both (opposing) sides of the cooling water passage 11. The insulating cover 23 may be formed of any suitable materials, such as plastic and the like.

Thus, for example, the insulating member 21 having a shape corresponding to the shape of the cooling water passage 11 may be formed in advance, and may then be inserted into the cooling water passage 11 to provide insulation.

The insulating member 21 may be formed of any suitable insulating materials to provide the desired insulation properties. In accordance with some embodiments, the insulating member 21 is formed of an insulating rubber material such as fluorine, silicon, and Ethylene Propylene Diene Monomer (EPDM). Such materials can be suitably formed into a shape corresponding to the internal surface shape of the cooling water passage 11 such that the insulating member 21 can be inserted into the cooling water passage 11 of the manifold block 10 so as to be in contact the inner surface of the cooling water passage 11.

Thus, according to the present invention, insulation of the cooling water passage 11 can be guaranteed by pre-forming and inserting the insulating member 21 into the cooling water passage 11, rather than by a conventional insulation coating process on the manifold block 10.

As described above, the insulating member 21 may have a shape corresponding to the shape of the cooling water passage 11 of the manifold block 10 such that it contacts the inner surface of the cooling water passage 11. According to some embodiments, flanges 21b, 22 may be formed at both ends of the insulating member 21. In some embodiments, the flanges 21b, 22 may have a structure that matches or corresponds to the end surface of the stack module 30 (end plate) and the end surface of the interface part 14.

The flanges 21b, 22 formed at the both ends of the insulating member 21 may also match the shape of the cooling water passage 11 to surround the entire outer edge of the cooling water passage 11 at the manifold block 10. As shown, flanges 21b, 22 may be tightly disposed between the end surface of the manifold block 10 and the end surface of the end plate 31 and between the end surface of the manifold block 10 and the end surface of the interface part 14 while contacting the flange 24 of the insulating cover 23.

The insulating member 21 may be forcibly inserted into the end portion of one side of the cooling water passage 11 of the manifold block 10. According to some embodiments, the insulating member 21 is inserted into the end portion of the cooling water passage 11 near the stack module 30 and in a direction toward the interface part 14.

In this case, in order to pass the insulating member 21 into a portion of the cooling water passage 11 that is bent, a ring 21a or the like may be formed at one end of the insulating member 21. The insulating member 21 may be inserted into the cooling water passage 11 at the stack module 30, and then may be pulled toward the interface part 14 using the ring 21a.

The insulating member 21 that is inserted may serve to provide insulation to the cooling water passage 11. According to some embodiments, the insulating member 21 has a thickness that is limited to a degree that will not undesirably reduce the cross-sectional area of the cooling water passage 11, and, thus, the insulating member 21 may become separated from the inner surface of the cooling water passage 11 due to the flow of cooling water. Accordingly, an insulating cover 23 formed of a suitable material, such as plastic, may be further inserted into the cooling water passage 11 to secure the insulating member 21 in place. In particular, the insulating cover 23 may be inserted so as to fix and protect the insulating member 21. As shown in FIG. 3, the insulating cover 23 may have passage insertion parts 23a and 23b that are inserted into the cooling water passage 11 and which contact the inner surface of the insulating member 21. As shown in FIGS. 2 through 5, the passage insertion parts 23a and 23b may be provided and inserted at the both (opposing) ends of the cooling water passage 11, respectively.

The insulating cover 23 may be manufactured by any suitable method, such as plastic injection molding. In consideration of the injection structure and the flow direction of cooling water, divided parts (boundary spot) of the passage insertion parts 23a and 23b may be determined from the insulating cover 23. In this case, for example, the insulating cover 23 may be manufactured to have a shape in which the divided parts of the passage insertion parts 23a and 23b contact each other when both passage insertion parts 23a and 23b of the insulating cover 23 are completely inserted into the cooling water passage 11 of the manifold block 10, respectively.

As shown in FIGS. 2-5, a flange 24 may be formed at the end portion of the insulating cover 23, and may be directly connected to the end plate 31 of the stack module 30. As shown, the flange 24 of the insulating cover 23 may be a portion contacting the flange 22 of the insulating member 21. When configured, the flange 22 of the insulating member 21 and the flange 24 of the insulating cover 23 may form a portion that is tightly disposed between the end plate 31 and the manifold block 10.

As shown in FIG. 2, in addition to fixation and protection of the insulating member 21, the insulating cover 23 together with the insulating member 21 may serve to secure air-tightness between components.

As shown in FIGS. 2 and 3, a groove 25 may be formed in the flange 24 of the insulating cover 23 to dispose a sealing gasket 32 between the end plate 31 of the stack module 30 and the flange 24 of the insulating cover 23. The insulating cover 23 of the manifold block 10 may be directly coupled to the end plate 31 of the stack module 30 while the gasket 32 is disposed in the groove 25 of the insulating cover 23 of the manifold block 10.

In a related art, a groove for inserting a gasket is formed in a contact surface of a manifold block that is manufactured by a casting process. The gasket is inserted into the groove, and then the manifold block and an end plate are directly coupled. However, due to the characteristics of the casting process, it is difficult to form a gasket groove having a uniform width. Also, due to the irregular width (width deviation of about 1 mm to about 3 mm due to the manufacturing tolerance) of the groove, it is difficult to secure the quality of an insulating coating.

Also, since electric charges are concentrated on the edge portion of the groove after the insulation coating is applied, a portion that is electrically weak is provided.

Accordingly, in this embodiment, the above limitations may be overcome by forming the groove 25 for inserting a gasket in the insulating cover 23 formed of plastic material. In particular, a sealing protrusion 26 may be formed on the flange 24 of the insulating cover 23, and may be compressed on the flange 22 of the insulating member 21. The sealing protrusion 26 may maintain air-tightness between the flanges 22 and 24. The sealing protrusion 26 may be formed to protrude longitudinally along the line of the gasket 32 (i.e. the line of the groove formed in the rear surface and in which the gasket 32 is inserted) disposed between the end plate 31 of the stack module 30 and the insulating cover 23.

Thus, since the sealing protrusion 26 is formed to protrude along the line of the gasket 32, when the gasket 32 disposed between the stack module 30 and the insulating cover 23 compresses the flange 24 of the insulating cover 23, the sealing protrusion 26 of the flange 24 may compress the flange 22 of the insulating member 21. Accordingly, excellent air-tightness performance can be achieved.

According to some embodiments, the sealing protrusion may be formed on the flange 22 of the insulating member 21 instead of the flange 24 of the insulating cover 23. In this case, the sealing protrusion may compress the flange 24 of the insulating cover 23, and may also be formed to protrude longitudinally along the line of the gasket 32.

According to some embodiments, a bolt cover 27 may also be integrally formed on one side of the insulating cover 23. The bolt cover 27 may cover a coupling part for bolt coupling of the manifold block 10. The bolt cover 27 may serve as an insulator between a bolt and the manifold block 10, by overlapping the bolt cover 27 on the coupling part of the manifold block 10 and then fastening the bolt.

Figure 7:
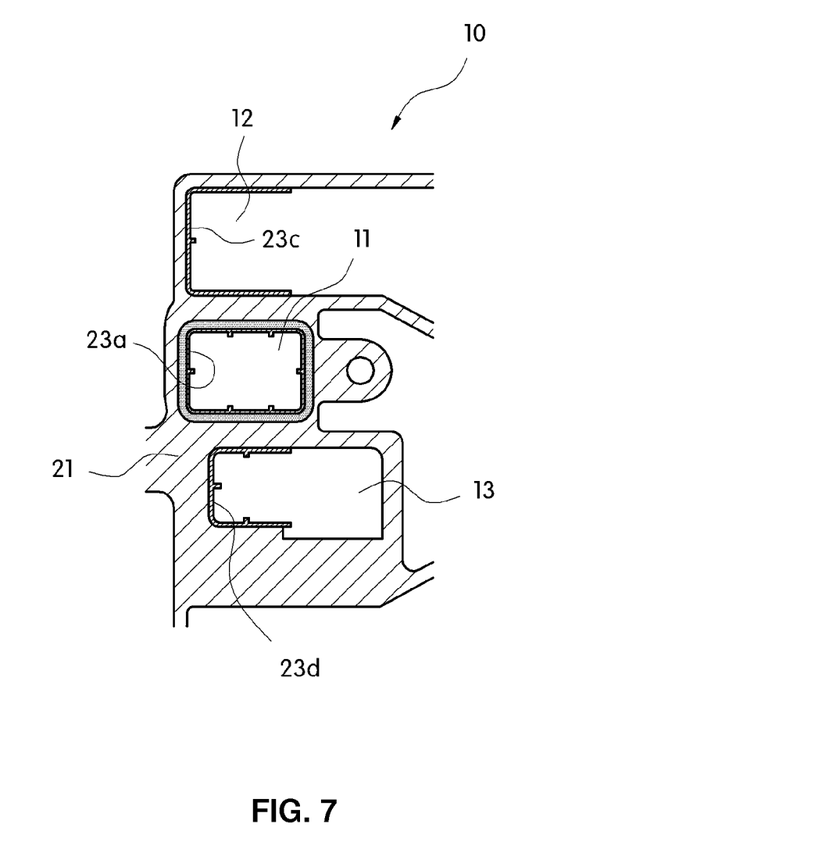
FIG. 7 is a cross-sectional view of a manifold block according to an embodiment of the present invention, which illustrates an insulating cover disposed in an air passage and a hydrogen passage of the manifold block.

FIG. 7 is a cross-sectional view of the manifold block 10 according to an embodiment of the present invention, which is taken along line A-A of FIG. 2. In FIG. 7, the insulation cover 23 is shown as inserted into an air passage 12 and a hydrogen passage 13 of the manifold block 10.

Since the passages 12 and 13 are formed to supply air and hydrogen reactant gases in addition to the cooling water passage 11, the passage insertion parts 23c and 23d of the insulating cover 23 for fixing and protecting the insulating member 21 may also be inserted into the air passage 12 and the hydrogen passage 13 to contact the inner surfaces of these passages 12 and 13.

Water as well as electricity is generated from an electrochemical reaction in the stack module 30. The generated water may be exhausted to the outside through the air passage 12 and hydrogen passage 13 of the manifold block 10.

The generated water may form an electrical passage between the stack module 30 and the manifold block 10 while being exhausted along the air passage 12 and the hydrogen passage 13, which may also cause electrical harm to a user or a worker, although temporary and slight compared to a leakage current caused by cooling water.

Accordingly, the insulating cover 23 for fixing and protecting the insulating member 21, as shown in FIG. 7, may be inserted into the passages (air passage 12 and hydrogen passage 13) of reactant gases and to form passage insertion parts 23c and 23d that cover the inner surface of the passages 12 and 13, respectively, and may allow a portion of the passages 12, 13 covered by the passage insertion parts 23c and 23d to be electrically insulated.

According to a manifold block for a fuel cell stack of the present invention, excellent insulation and insulation durability can be guaranteed without carrying out insulation coating, and electrical corrosion can be prevented, by inserting a preformed insulating member into the cooling water passage. The insulating member is formed of any suitable insulating material (e.g., rubber) and is shaped to correspond to the shape of a cooling water passage. An insulating cover for fixing and protecting the insulating member can further be inserted in the insulating member, for example, by inserting a two-part plastic (or other suitable material) insulating cover at both (opposing) sides of the cooling water passage.

The invention has been described in detail with reference to exemplary embodiments thereof. However, it will be appreciated by those skilled in the art that changes may be made in these embodiments without departing from the principles and spirit of the invention, the scope of which is defined in the appended claims and their equivalents.

What is claimed is:

1. A manifold block for a fuel cell stack, coupled to a fuel cell stack module, the manifold block attached to an outer side of an end plate of the fuel cell stack with gasket disposed there between, comprising:
    a gas passage and a cooling water passage;
    an insulating member inserted into the cooling water passage and contacting an entire inner surface of the cooling water passage, the insulating member having a preformed tube-like shape and configured to electrically insulate the cooling water passage; and
    an insulating cover inserted into the cooling water passage and contacting an entire inner surface of the insulating member, the insulating cover configured to fix and protect the insulating member,
    wherein the insulating cover has a two-part structure at a passage insertion part thereof that is inserted into the cooling water passage, and
    wherein each part of the insulating cover is inserted into the cooling water passage at opposing sides of the cooling water passage to be connected to each other such that the entire inner surface of the insulating member is covered by the insulating cover.

2. The manifold block of claim 1, wherein when the two insulating cover parts are completely inserted into the cooling water passage, the passage insertion parts of the two insulating cover parts are connected to each other.

3. The manifold block of claim 1, further comprising:
    a flange at both end portions of the insulating member configured to surround the outer edge of the cooling water passage; and
    a flange at an end portion of the insulating cover configured to contact the flange of the insulating member,
    wherein the flange of the insulating cover and the flange of the insulating member are tightly disposed between the manifold block and the stack module while being coupled to each other.

4. The manifold block of claim 3, wherein the flange of the insulating cover has a groove for inserting a sealing gasket between the stack module and the manifold block.

5. The manifold block of claim 3, wherein the flange of the insulating cover has a sealing protrusion that is compressed on the flange of the insulating member to maintain air-tightness between the flanges.

6. The manifold block of claim 3, wherein the flange of the insulating member has a sealing protrusion that is compressed on the flange of the insulating cover to maintain air-tightness between the flanges.

7. The manifold block of claim 5, wherein the sealing protrusion is formed to protrude longitudinally along a line of the sealing gasket and disposed between the flange of the insulating cover and the stack module.

8. The manifold block of claim 6, wherein the sealing protrusion is formed to protrude longitudinally along a line of the sealing gasket and disposed between the flange of the insulating cover and the stack module.

9. The manifold block of claim 1, wherein the insulating cover further comprises a passage insertion part that is inserted into the gas passage of the manifold block to cover an inner surface of the gas passage.

10. The manifold block of claim 1, wherein the insulating cover comprises a bolt cover that is integrally formed and covers a coupling part where the manifold block is coupled with a bolt, wherein when the bolt is fastened in a state where the bolt cover overlaps the coupling part of the manifold block, the bolt cover serves as an insulator between the bolt and the manifold block.

11. The manifold block of claim 1, wherein the cooling water passage has a rectangular shaped section and a straight-line shaped section that is obliquely bent with respect to the rectangular shaped section, and the insulating member has a shape corresponding to the shape of the cooling water passage.

* * * * *